United States Patent
Schorr et al.

(10) Patent No.: US 6,647,722 B2
(45) Date of Patent: Nov. 18, 2003

(54) DEVICE TO REDUCE VIBRATIONS IN A HYDRAULIC FORCE TRANSFER SYSTEM

(75) Inventors: Rainer Schorr, Hassfurt (DE); Karsten Paeth, Ebern-Unterpreppach (DE)

(73) Assignee: FTE automotive GmbH (DE)

( * ) Notice: Subject to any disclaimer, the term of this patent is extended or adjusted under 35 U.S.C. 154(b) by 0 days.

(21) Appl. No.: 10/081,144

(22) Filed: Feb. 21, 2002

(65) Prior Publication Data

US 2002/0129603 A1 Sep. 19, 2002

(30) Foreign Application Priority Data

Mar. 16, 2001 (DE) .......................... 101 12 674

(51) Int. Cl.$^7$ .................................. F15B 7/10
(52) U.S. Cl. ..................... 60/592; 60/469; 92/103 M
(58) Field of Search .................. 60/533, 592, 469; 92/101, 103 M

(56) References Cited

U.S. PATENT DOCUMENTS 5,070,983 A * 12/1991 Leigh-Monstevens et al. ........................ 60/469
5,816,046 A * 10/1998 Paeth et al. .................... 60/469
6,430,928 B1 * 8/2002 Iyer et al. ....................... 60/592

* cited by examiner

Primary Examiner—Edward K. Look
Assistant Examiner—Michael Leslie
(74) Attorney, Agent, or Firm—McAndrew, Held & Malloy, Ltd.

(57) ABSTRACT

A device is disclosed to reduce vibrations in a hydraulic force transfer system which has a master cylinder and a slave cylinder connected with this via a fluid column. The device has a housing and a membrane attached by its edge to the housing. The housing and the membrane delimit a chamber which can be connected via a connection with the master cylinder and via a further connection with the slave cylinder so that the membrane can be hydraulically pressurized by the fluid column between the master cylinder and slave cylinder. According to the invention the membrane is pressed, at least in the rest state of the hydraulic force transfer system, by means of a spring element against the direction of the hydraulic pressure on the membrane against a chamber-side support surface. The result is a simply constructed device to reduce vibrations in a hydraulic force transfer system.

23 Claims, 2 Drawing Sheets

DEVICE TO REDUCE VIBRATIONS IN A HYDRAULIC FORCE TRANSFER SYSTEM

BACKGROUND OF THE INVENTION

The present invention concerns a device to reduce vibrations in a hydraulic force transfer system. In particular, the invention relates to a device to suppress or reduce vibrations of the clutch pedal of a hydraulic clutch control in a motor vehicle.

DESCRIPTION OF THE PRIOR ART

The conventional hydraulic clutch control has a master cylinder which can be activated via a clutch pedal and which is connected to a reservoir. The master cylinder is hydraulically connected via a pressure line with the slave cylinder, so that, when the clutch pedal is pressed, the pressure generated in the master cylinder is transferred via the fluid column in the pressure line to the slave cylinder. As a result the clutch release bearing receives an activation force from the slave cylinder in order to separate via a release mechanism the clutch pressure plate from the clutch flywheel and hence the combustion engine from the gearbox of the motor vehicle.

In such hydraulic clutch controls, which can be regarded as quasi-stationary hydraulic force transfer systems in which there is no continuous flow of hydraulic fluid, the problem arises that vibrations from the combustion engine are transferred via the clutch plate, release mechanism, release bearing and fluid column in the pressure line between the slave cylinder and the master cylinder to the clutch pedal, so the clutch pedal vibrates perceptibly for the driver when he presses this down to release the clutch. The vibrations on the slave cylinder are transferred via the fluid column in the pressure line to the master cylinder as pressure pulses.

To solve this problem as illustrated by DE 195 40 753 C1 of the applicant it was proposed to connect an additional oscillator in the pressure line between the slave cylinder and the master cylinder. This additional oscillator has a housing, the base and/or cover of which is formed by a freely vibrating membrane whose edge is firmly clamped to the housing and which together with the housing delimits a chamber which can be connected via connections to the master cylinder and slave cylinder of the hydraulic clutch control so that the membrane is pressurized by the fluid column between the master cylinder and slave cylinder.

In this state of the art, because of a low frequency exciter vibration on the slave cylinder a low frequency pressure pulse is transmitted via the fluid column between the master cylinder and slave cylinder, where this pressure pulse excites the additional oscillator provided in the fluid column and tuned accordingly such that the additional oscillator vibrates at its inherent frequency which is higher than the frequency of the low frequency pressure pulse, so that the additional oscillator in the fluid column induces a higher frequency pressure pulse which the vibration-susceptible system comprising the master cylinder and clutch pedal cannot follow.

The structure or tuning of the additional oscillator known from DE 195 40 753 C1 has amongst others the advantage that to reduce the vibration, less volume increase is required than in solutions based on another action principle, such as for example in GB-A-1 562 709 or U.S. Pat. No. 5,070,983 in which a membrane, which together with a housing delimits a pressure chamber communicating with the fluid column, merely follows the pressure pulses in the fluid column in order to damp these. Together with the relatively larger volume increase this method has higher undesirable declutching losses, which on activation of the clutch pedal are perceptible for the driver in particular as a softer clutch control, a greater travel on the clutch pedal and the lack of a pressure point.

Due to the reduction in volume increase caused by the active principle according to the state of the art shown by DE 195 40 753 C1, the stop surfaces for the membrane on the side of the membrane facing away from the pressure chamber can be omitted; according to the disclosure of U.S. Pat. No. 5,070,983, these are provided for example in the form of a projection or plate spring in order to prevent excess curving of the pressurized membrane.

It has in practice however been found that the additional oscillator according to DE 195 40 753 C1 could be improved for certain applications in respect of response behavior and volume increase. The present invention is therefore based on the task, starting from the state of the art according to DE 195 40 753 C1, of producing a simply designed device to reduce vibrations in a hydraulic force transfer system which can easily be modified in respect of response behavior and volume increase to the requirements in each case.

SUMMARY OF THE INVENTION

According to the present invention, there is provided a device to reduce vibrations in a hydraulic force transfer system which has a master cylinder and a slave cylinder connected to the master cylinder via a fluid column, with a housing and a membrane, the membrane having an edge by which it is attached to the housing, wherein the housing and the membrane delimit a chamber which can be connected via a connection to the master cylinder and via a further connection to the slave cylinder, so that the membrane can be pressurized hydraulically by the fluid column between the master cylinder and slave cylinder, and wherein the membrane, at least in a rest state of the hydraulic force transfer system, is pressed by means of a spring element against the direction of the hydraulic pressurization of the membrane against a support surface on the chamber side.

As a result of this defined pressure from the spring and associated more difficult deflection of the membrane, with otherwise the same geometry and same material of membrane, the volume increase of the device can be reduced in comparison with the known state of the art, or by suitable selection or design of the spring element can easily be adapted to the requirements of the given system conditions in the manner of a modular system. Tests by the applicant have here led to the surprising result that with the structure of the device according to the invention nonetheless a vibration reduction occurs which is comparable to the vibration reduction achieved with the freely oscillating membrane according to DE 195 40 753 C1. It is assumed that the active principle of the device according to the invention here corresponds to the known state of the art, where, depending on the selection or design of membrane and spring element and the amplitude of the pressure pulses occurring in the fluid column, the system consisting of membrane and spring element or just the membrane oscillates in its "free" areas i.e. the areas which are not directly pressurized by the spring element or do not lie directly between the spring element and the supporting surface on the chamber side.

Furthermore the spring element and supporting surface on the chamber side constitute a mechanical support for the membrane which allows the use of membranes of reduced thickness and/or greater diameter without the risk of mechanical overload of the membrane. The possible enlargement of the ratio of diameter to thickness of the membrane can advantageously lead to a reduction in hysteresis of the device i.e. its pressure loss, and the elasticity of the device, i.e. the ratio of pressure loss to volume increase, or its adaptation to the relevant requirements as will be described below, whereby the device can react more sensitively to pressure pulses in the fluid column and have an improved response behavior and overall a better vibration-reducing effect.

The housing preferably has a projection extending centrally from the base of the chamber in the direction of the membrane, which in a simple manner forms the supporting surface for the membrane.

The housing suitably has an annular groove concentrically surrounding the chamber to receive a sealing element lying against the membrane which seals the chamber against the environment. Preferably, the housing has a ring-cylindrical section between the chamber and annular groove against which the membrane lies at least in the rest state of the hydraulic force transfer system, where the ring-cylindrical section has at least one connecting channel which connects the chamber with the annular groove so that on assembly of the device in the hydraulic force transfer system secure filling of the chamber with hydraulic fluid is possible without air inclusions remaining in the annular groove.

A face of the ring-cylindrical section and the support surface on the projection can lie in one plane so that the membrane loaded by the spring element in the rest state of the hydraulic force transfer system is advantageously held flat. Depending on the requirements concerned it is however also possible to provide an offset between the supporting surface on the projection and the face surface on the ring-cylindrical section in the axial direction of the device and/or to chamfer or make convex the supporting surface at the projection and/or the face surface at the ring-cylindrical section so that the membrane is held curved convex or concave under a defined pretension.

A cover can be provided on the essentially pot-like housing which together with the housing clamps the membrane at its edge whereby the spring element rests with its end facing away from the membrane on the cover. Such a cover can not only form the support required for the spring element in a simple and stable manner but also ensure that the hydraulic force transfer system in which the device is fitted cannot leak if the membrane is damaged and thus cannot fail.

In principle it is possible to attach the cover to the housing by means of a bayonet closure, for example, or by welding the housing and cover together. However, a design is preferred according to which the cover is attached to the housing by means of a threaded connection where the cover has an external threaded section which can be screwed into an internal threaded section of the housing. Such a threaded connection firstly allows easy replacement of the membrane. Secondly by means of a threaded connection the retention or clamping forces for the membrane can be set positively.

The threaded connection is preferably structured as both a sawtooth and a round thread such that at least the internal threaded section of the housing at the external diameter of the thread profile is rounded in a round thread-like manner and at the internal diameter of the thread profile has a rounded sawtooth thread-like form. If the housing and cover are injection-molded of plastic, such a threaded connection is easily structured at the same time. In addition the threaded connection described above has advantages in that due to the sawtooth thread-like structure on the internal diameter of the thread profile on the housing a greater thread bearing depth can be achieved than with a conventional trapezoid thread, whereas the round thread-like structure on the external diameter of the thread profile on the housing ensures a reduction in notch effect in comparison with conventional trapezoid thread, which is particularly important for the durability of the housing when plastic is used as a housing material.

The cover preferably has a central receiving and guiding section for the spring element which easily prevents the spring element from moving radially in the device and thus unintentionally pressurizing the membrane at different points.

In principle the spring element can be a spring ring or plate spring. However the use of a coil compression spring is preferred.

The spring element can be surrounded concentrically by a flange sleeve which has a ring collar arranged between the end of the spring element facing the membrane and the membrane. This simply prevents any sharp-edged parts of the spring element from damaging the membrane. The face of the ring collar facing the membrane can for example be crowned. In particular for production reasons, however, a flat structure of this face is preferred.

The flange sleeve can be suitably guided in an axial mobile manner in a receiving and guiding section of the cover. Preferably, the flange sleeve has here a peripheral projection on the external periphery on the end facing away from the membrane whereas the receiving and guiding section of the cover has a peripheral projection on the inner periphery on its end facing the membrane, where the peripheral projection of the flange sleeve has an external diameter slightly larger than the internal diameter of the peripheral projection on the receiving and guiding section of the cover. This design of cover and flange sleeve firstly simplifies assembly of the device because the flange sleeve, after receiving the spring element, can be locked with the receiving and guiding section in the receiving and guiding section of the cover so that when the cover is screwed in/attached to the housing, there is no multiplicity of components to be handled. Secondly the peripheral projections on the flange sleeve and receiving and guiding section of the cover ensure defined and free-moving guidance of the flange sleeve in the receiving and guiding section of the cover.

Suitably the membrane can consist of spring steel. With a spring steel membrane with a ratio of diameter to thickness of the membrane preferably between 40 and 160, more preferably between 60 and 90, with the device according to the invention particularly good results can be achieved in the reduction of vibrations in a hydraulic clutch control.

The housing and/or cover and/or flange sleeve are preferably injection-molded of plastic. In the known state of the art as a material for the housing of the additional oscillator an aluminum alloy was used where the semi-finished product for the housing was extrusion-molded then trimmed and finally machined. With injection molding of plastic, however, the housing can advantageously be produced in one working process straight from the tool i.e. with no further processing steps. It is evident that by this material substitution productivity can be considerably increased and the production costs for the housing essentially reduced.

The device according to the invention can be connected in a hydraulic force transfer system finally in the fluid column between the slave cylinder and master cylinder such that with its corresponding connection it is directly plug-connected to the master cylinder or alternatively its housing is an integral part of the housing of the master cylinder. In the trials of the device according to the invention, it was found that the vibration-reducing effect of the device according to the invention, stiffer than the known state of the art due to the spring pressure on the membrane, is the better the closer it is arranged to the master cylinder.

BRIEF DESCRIPTION OF THE DRAWINGS

For a better understanding of the invention and to show how the same may be carried into effect, reference will now be made, by way of example, to the accompanying drawings, in which.

DESCRIPTION OF THE PREFERRED EMBODIMENT

Figure 1:
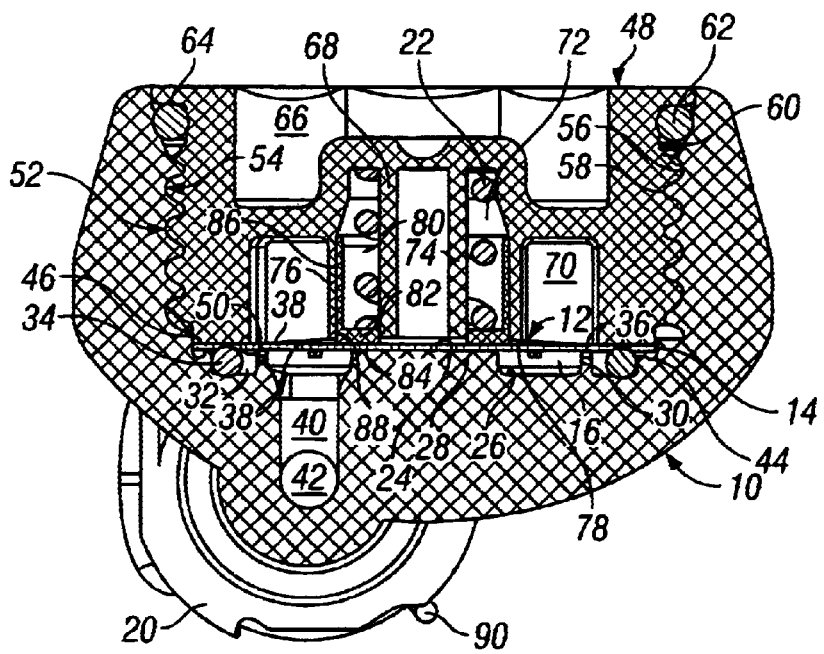
FIG. 1 is a section view of a device according to the invention for reducing vibrations in a hydraulic force transfer system in assembled state where the oscillatable membrane is not pressurized hydraulically.
Figure 2:
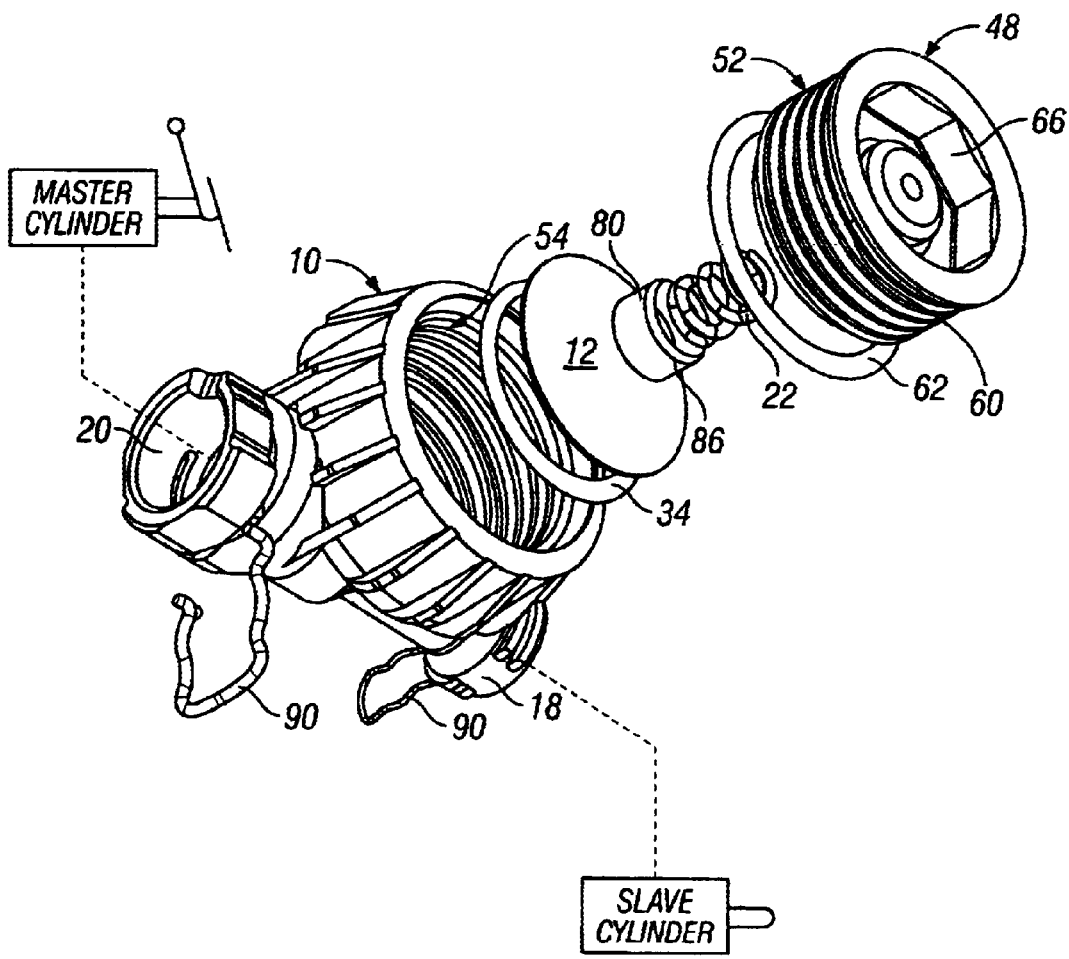
FIG. 2 is an exploded view of the device shown in FIG. 1.

FIGS. 1 and 2 show a device for reducing vibration which can be fitted in a hydraulic force transfer system (not shown) with a master cylinder and a slave cylinder connected with this via a fluid column. The device has a housing 10 and a membrane 12 which is attached with its edge 14 to the housing 10 in a manner to be described. The housing 10 and the membrane 12 delimit a pressure chamber 16 which can be connected via a connection 20 with the master cylinder not shown here and via a further connection 18 with the slave cylinder also not shown here so that the membrane 12 can be pressurized hydraulically by the fluid column between the master cylinder and the slave cylinder. It is important that the membrane 12 is pressed, at least in the rest state of the hydraulic force transfer system, by means of a spring element 22 against the direction of the hydraulic pressurization of the membrane 12, i.e. in FIG. 1 downwards, against a supporting surface 24 on the chamber side.

In relation to the active principle of the device described here it should be noted at this point that the device fitted in a hydraulic force transfer system serves less to damp the pressure amplitude of the pressure pulses induced via the slave cylinder into the fluid column than to modulate the frequency of the exciter vibration or move the exciter vibration into a higher frequency range such that a higher frequency vibration occurs at the output from the device or at the master cylinder. The oscillatable system comprising the master cylinder and a control element such as a clutch pedal cannot follow this higher frequency vibration because of its inertia and therefore remains at rest. Further details of the principle of action of the device described here, which can be also be described as a frequency modulator, can be taken from DE 195 40 753 C1 of the applicant.

As FIG. 1 in particular shows, the housing 10 injection-molded of plastic and substantially pot-like in the embodiment shown has a cylindrical projection 28 extending centrally from a flat base 26 of the chamber 16 in the direction of membrane 12 which forms the support surface 24. The projection 28 delimits the chamber 16 radially inwards so that the chamber 16 has an annular form. Radially outwards the chamber 16 is limited by a ring-cylindrical section 30 to which connects an annular groove 32 surrounding the chamber 16 concentrically. The annular groove 32 serves to hold an elastic sealing element 34 such as an O-ring lying against the membrane 12 which seals the chamber 16 against the environment. For the sake of simplicity the sealing element 34 is shown in FIG. 1 in undistorted state. By holding the sealing element 34 in the annular groove 32, in particular during assembly of the device, a defined position of the sealing element 34 is ensured so that this cannot be damaged.

At least in the rest state of the hydraulic force transfer system, the membrane 12 lies against the ring-cylindrical section 30 between the chamber 16 and the annular groove 32. The face 36 of the ring-cylindrical section 30 facing the membrane 12 lies with support surface 24 on projection 28 in one plane so that the membrane 12 loaded by spring element 22 is held flat here. Furthermore, starting from its face 36, the ring-cylindrical section 30 is fitted with a multiplicity of radial connecting channels 38 spread evenly around the periphery. The connecting channels 38 connect the chamber 16 with the annular groove 32 and thus prevent air inclusions remaining in the annular groove 32 when the chamber 16 is filled with hydraulic fluid.

Starting from the base 26 of the chamber 16, a connecting channel 40 extends in the axial direction of the device. The connection channel 40 opens into a transverse through bore 42 which links together connections 18 and 20. It clear that the annular chamber 16, the volume increase of which according to the applicant's tests is of secondary importance to the function of the device, is connected quasi-parallel to the fluid column which is pushed through the through bore 42 on operation of the hydraulic force transfer system.

Connected radially outwards to the annular groove 32 for holding the sealing element 34 is another ring-cylindrical section 44. The face surface 46 facing the membrane 12 of the further ring-cylindrical section 44, which in the embodiment shown lies in one plane with face 36 of the ring-cylindrical section 30 and support surface 24 of the central projection 28, on clamping of the membrane 12 acts as a support for the edge 14 of the membrane 12.

As shown in particular in FIG. 1, on the housing 10 in the example shown is provided a cover 48 also injection-molded from plastic. The cover 48 has an annular surface 50 by means of which the membrane 12 is held at its edge 14 against the face 46 of the ring-cylindrical section 44 on the housing 10 in order to clamp the membrane 12 definitely.

The cover 48 is attached by means of a threaded joint to housing 10 where the cover 48 has an external threaded section 52 which is screwed into an internal threaded section 54 of the housing 10. In the embodiment shown, to increase the bearing depth and reduce the notching effect, the threaded connection is formed both as sawtooth and round thread-like, where the internal threaded section 54 of the housing 10 is rounded in the manner of a rounded thread at the external diameter 56 of the thread profile, and at the internal diameter 58 of the thread profile has a rounded sawtooth thread-like form. The external threaded section 52 on the cover 48 is formed complementary to the internal threaded section 54 of the housing 10.

In FIG. 1, connected to the external threaded section 52 at the top, the cover 48 has an annular groove 60 to hold an elastic sealing element 62 for example an O-ring which for simplicity is also shown in undistorted state. When the cover 48 is screwed into the housing 10, the sealing element 62 co-operates with a tapered sealing section 64 of the housing 10 in order to seal the interior of the housing 10 against the environment. It is clear that with this design of the device, even in the case of failure of the membrane 12, leakage of the hydraulic fluid from the device is prevented, where admittedly the vibration-reducing effect of the device is lost but failure of the hydraulic force transfer system in which the device is fitted is avoided.

Starting from its outer surface the cover 48 is fitted centrally with a polygonal socket 66 by which it can be held with a tool (not shown) in order to screw the cover 48 into the housing 10. On its inner surface the cover 48 is formed as a support on which the spring element 22 can rest with its end facing away from the membrane 12.

More precisely the cover 48 here has a central receiving and guiding section 68 surrounded concentrically by an annular chamber 70. The receiving and guiding section 68 has an annular chamber 72 to hold the spring element 22. The annular chamber 72 is limited radially inwards by a central hollow cylindrical projection 74 which extends only so close to the membrane 12 that the membrane 12, on operation of the hydraulic force transfer system, cannot rest on the projection 74. The projection 74 of the receiving and guiding section 68 serves to guide radially inwards the spring element 22 held in the annular chamber 72, in the example given a coil compression spring.

Radially outwards the annular chamber 72 is limited by a ring-cylindrical section 76 which separates the annular chambers 70 and 72. The face 78 of the ring-cylindrical section 76 is tapered radially inwards and held at a distance from the membrane 12. The ring-cylindrical section 76 of the receiving and guiding section 68 serves to guide radially inwards, in an axially displaceable manner, a flange sleeve 80 concentrically surrounding the spring element 22.

Flange sleeve 80 in the design example shown is also injection-molded from plastic and has a ring collar 82 extending radially inwards which is arranged between the end of the spring element 22 facing the membrane 12 and the membrane 12 to prevent damage to the membrane 12 by the spring element 22, to improve the slip behavior between the spring element 22 and membrane 12 and ensure a defined force application on membrane 12 by the spring element 22. Here the face 84 of the ring collar 82 facing the membrane 12 is also formed flat. The external diameter of the flange sleeve 80 is kept only slightly larger than the external diameter of the projection 28 forming the support surface 24 on the housing 10.

Furthermore, the flange sleeve 80 on its end facing away from the membrane 12 has on its outer periphery a peripheral projection 86 or rib, while the receiving and guiding section 68 of the cover 48—more precisely its ring-cylindrical section 76—has on its end facing the membrane 12 on its inner periphery a peripheral projection 88 or rib. The peripheral projection 86 of the flange sleeve 80 has an external diameter slightly larger than the internal diameter of the peripheral projection 88 on the receiving and guiding section 68 of the cover 48 so that the flange sleeve 80 can lock in the receiving and guiding section 68 of the cover 48.

Finally it can be seen in FIG. 2 that connections 18 and 20 of the housing 10, ribbed on its outer periphery for better handling, are formed as plug connections, each of which can be connected tightly and releasably by means of a metal securing element 90 directly to the cylinder (not shown) or to a pipe fitting (also not shown) of the hydraulic force transfer system. A particularly good vibration-reducing effect of the device can also be achieved if the device is arranged in the physical vicinity of the master cylinder or with its corresponding connection 20 directly to the master cylinder. Alternatively, it is conceivable that the housing of the device can be formed of one piece with the housing of the master cylinder.

From the description above, it is clear that the membrane 12 at a central section, at least in the rest state of the hydraulic force transfer system, is pressed via the face 84 of the ring collar 82 of the flange sleeve 80 with a force defined by the pre-tension of the spring element 22 against the support surface 24 of the projection 28 on the housing 10. As a result the volume increase of the device compared with the volume increase of a device without a corresponding spring element is reduced. Also the membrane 12 has a mechanical support which allows the diameter of the membrane 12 to be increased and/or the thickness of the membrane 12 to be reduced without the risk of failure of the membrane 12 in operation. According to the applicant's tests, the membrane 12 pressurized by the spring element 22 and preferably made of spring steel should here have a ratio of diameter to thickness of the membrane 12 of between 40 and 160, more preferably between 60 and 90. The resulting possible enlargement of the ratio of diameter to thickness of membrane 12 improves the hysteresis and elasticity of the device in the sense that the device can respond more sensitively to excitation vibrations. Depending on the design of the device with regard to pretension of the spring element 22, the diameter and/or thickness of the membrane 12—parameters which allow individual adaptation to the hydraulic force transfer system in which the device is to be fitted—and the amplitude of the pressure pulse which occurs in the fluid column of the hydraulic force transfer system, either the system comprising membrane 12, flange sleeve 80 and spring element 22 or merely the membrane 12 can be excited to vibrate in a ring area between the support surface 24 and the clamped edge 14 of the membrane 12 viewed in the radial direction.

Figure 3:
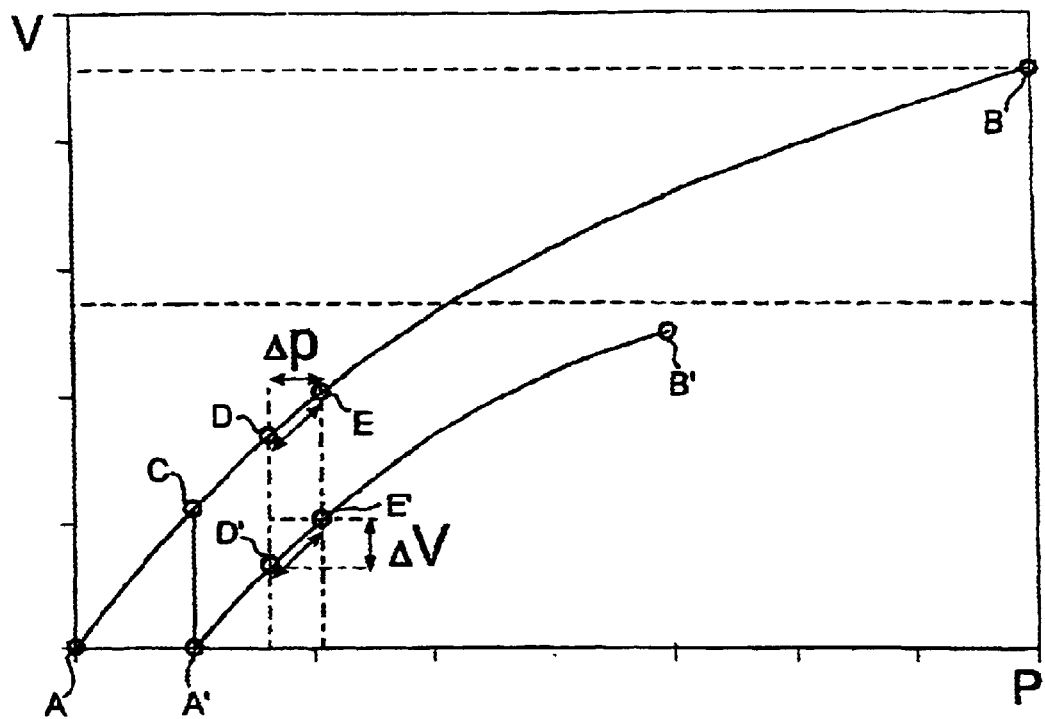
FIG. 3 is a diagram in which the volume increase V of a device for reducing vibration is shown idealised as a function of pressure P and which shows the influence on the volume increase V of a spring element loading the membrane against the pressurization direction.
Figure 4:
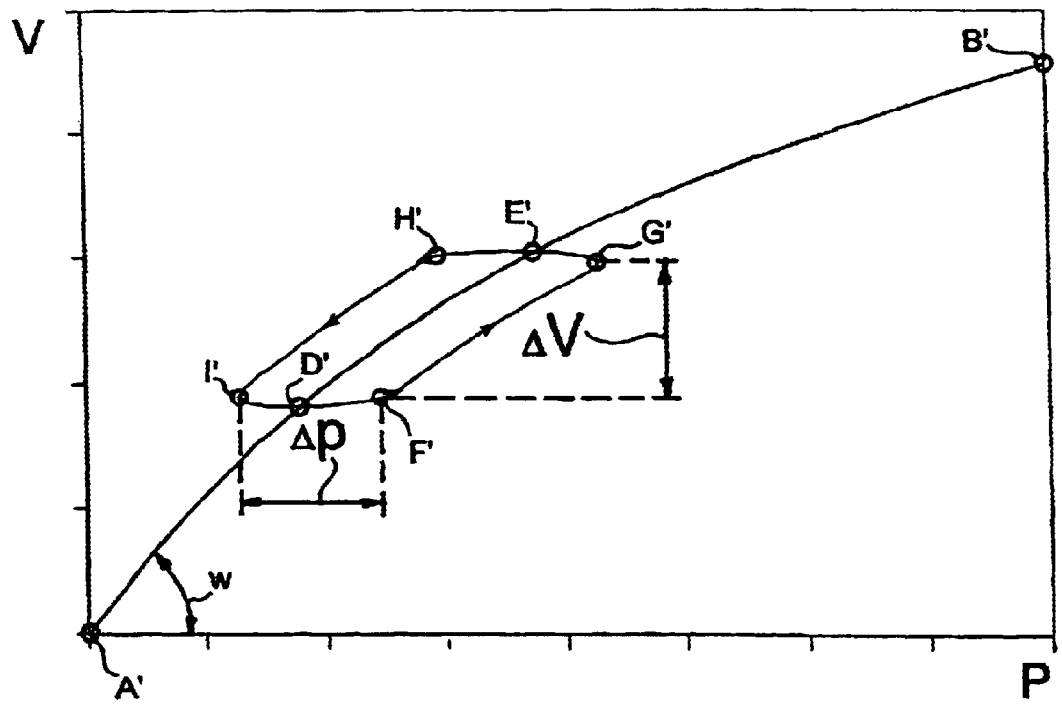
FIG. 4 is a diagram in which the volume increase V of a device for reducing vibration is shown idealised as a function of pressure P and which shows hysteresis of the device for a theoretical operating section.

Using FIGS. 3 and 4, the concepts of volume increase, hysteresis and elasticity of the device will finally be explained in more detail.

FIG. 3 shows idealised curves of the volume increase V of the device to reduce vibration as a function of pressure P, where the line AB represents a device without spring element and line A'B' represents a device in which the same membrane as described above is pressed against the pressurization direction by means of a spring element against a support surface on the pressure chamber side. It is clear that due to the provision of the spring element, the line AB is moved from the zero point A essentially parallel along the axis of pressure P towards the line A'B'. Thus at point A' of the new line A'B', with the same operating or activation pressure the entire volume increase is reduced in relation to line AB without spring element by amount A'C. The pressure fluctuations Δp over the operating sections DE and D'E' shown as examples nonetheless lead to essentially the same relative volume increase ΔV of the devices.

As a result by means of the spring element the overall volume increase of the device can be controlled, where stiffer spring elements lead to a relatively further displacement of the line to the right in FIG. 3. Adaptation of the device to the hydraulic force transfer system concerned in which the device shall be fitted is thus simple to achieve. Also with reduction of vibration the activation behavior of the hydraulic force transfer system can easily be optimised in the sense of harder pedal characteristics and shorter pedal travel.

FIG. 4 shows the hysteresis and elasticity of the device over a theoretical operating section D'E' of the idealised volume increase/pressure line A'B'. Starting from operating point D', pressure P must be increased by amount D'F' to give a volume increase ΔV from point F' to point G'. The section F'G' thus runs below the theoretical section D'E' but parallel to this. This offset by half the pressure loss Δp is called hysteresis and is caused by the specific friction and settling losses of the device. Thus in the device described above the settling losses only constitute a negligible fraction whereas the majority of losses are due to friction. In the subsequent pressure reduction over section G'H' the volume increase V of the device remains essentially constant and then falls above the theoretical section D'E' up to section H'I' to volume increase V at point I'. Without further change in volume V, pressure P increases again along section I'D' up to pressure P at point D'. Over sections H'I' and I'D' the parts of the device concerned are under friction.

Thus the hysteresis of the device for the theoretical section D'E' in the idealised line A'B' is described by the line F'G'H'I' under hydraulic loading and release of the device, whereas the ratio of pressure loss Δp and volume change ΔV (I'F'/F'G' or G'H'/H'I') can be called the elasticity of the device.

In order to achieve the maximum sensitivity of the device or a response behavior adapted to the hydraulic force transfer system concerned, at which even slight pressure increases Δp in the fluid column lead to a deflection of the membrane or a volume increase ΔV of the device and hence a vibration of the membrane, the elasticity Δp/ΔV of the device must be as small as possible. This is achieved by enlarging the ratio of diameter to thickness of the membrane, where first the spring element described above allows such an enlargement without the membrane being damaged in operation. An enlargement of the ratio of diameter to thickness of the membrane in the device with the idealised line A'B' in FIG. 4 leads to a steeper gradient not shown here, i.e. a line under a greater slope angle W. It is evident that with a steeper gradient shifted correspondingly anti-clockwise about point A' in FIG. 4, the ratio of pressure loss Δp to volume increase ΔV is reduced.

In summary, a device is disclosed for reducing vibrations in a hydraulic force transfer system which has a master cylinder and a slave cylinder connected to this via a fluid column. The device has a housing and a membrane attached at its edge to the housing. The housing and the membrane delimit a chamber which via a connection can be connected to the master cylinder and via a further connection to the slave cylinder so that the membrane can be hydraulically pressurized by the fluid column between the master cylinder and the slave cylinder. According to the invention the membrane at least in the rest position of the hydraulic force transfer system is pressed by means of a spring element against the direction of the hydraulic pressurization of the membrane against a support surface on the chamber side. The result is a simply constructed device to reduce vibrations in a hydraulic force transfer system which can easily be adapted in respect of response behavior and volume increase to the relevant requirements.

We claim:

1. A device to reduce vibrations in a hydraulic force transfer system which has a master cylinder and a slave cylinder connected to the master cylinder via a fluid column, with a housing and a membrane, the membrane having an edge by which it is attached to the housing, wherein the housing and the membrane delimit a chamber which can be connected via a connection to the master cylinder and via a further connection to the slave cylinder, so that the membrane can be pressurized hydraulically by the fluid column between the master cylinder and slave cylinder, and wherein the membrane, at least in a rest state of the hydraulic force transfer system, is pressed by means of a spring element against the direction of the hydraulic pressurization of the membrane against a support surface on the chamber side.

2. A device according to claim 1, wherein the chamber has a base and the housing has a projection extending centrally from the base of the chamber in the direction of the membrane, said projection forming said support surface.

3. A device according to claim 1, wherein the housing has an annular groove surrounding the chamber concentrically to hold a sealing element lying on the membrane, which seals the chamber against the environment.

4. A device according to claim 3, wherein the housing, between the chamber and the annular groove, has a ring-cylindrical section on which the membrane lies at least in the rest state of the hydraulic force transfer system, wherein the ring-cylindrical section has at least one connecting channel which connects the chamber with the annular groove.

5. A device according to claim 4, wherein the ring-cylindrical section has a face surface, and wherein said face surface and the support surface on the projection lie in one plane, so that the membrane loaded by the spring element is held flat in the rest state of the hydraulic force transfer system.

6. A device according to claim 1, wherein the housing is substantially pot-like, and wherein on the substantially pot-like housing is provided a cover which, together with the housing, clamps the membrane at its edge, wherein the spring element rests with its end facing away from the membrane on the cover.

7. A device according to claim 6, wherein the cover is attached to the housing by means of a threaded connection, wherein the cover has an external threaded section which can be screwed into an internal threaded section of the housing.

8. A device according to claim 7, wherein the threaded connection is formed as both sawtooth and round thread-like such that at least the internal threaded section of the housing is rounded in a round thread-like manner at the external diameter of the thread profile and at the internal diameter of the threaded profile has a rounded sawtooth thread-like form.

9. A device according to claim 6, wherein the cover has a central receiving and guiding section for the spring element.

10. A device according to claim 1, wherein the spring element is a coil compression spring.

11. A device according to claim 10, wherein the spring element is surrounded concentrically by a flange sleeve which has a ring collar arranged between the end of the spring element facing the membrane and the membrane.

12. A device according to claim 11, wherein the face of the ring collar facing the membrane is formed as a flat face.

13. A device according to claim 11, wherein the flange sleeve is guided axially mobile in the receiving and guiding section of the cover.

14. A device according to claim 13, wherein the flange sleeve at its end facing away from the membrane has on its outer periphery a peripheral projection while the receiving and guiding section of the cover at its end facing the membrane has on its inner periphery a peripheral projection, wherein the peripheral projection of the flange sleeve has an external diameter which is slightly larger than the internal diameter of the peripheral projection on the receiving and guiding section of the cover.

15. A device according to claim 1, wherein the membrane is made of spring steel.

16. A device according to claim 15, wherein the ratio of diameter to thickness of the membrane is between 40 and 160.

17. A device according to claim 15, wherein the ratio of diameter to thickness of the membrane is between 60 and 90.

18. A device according to claim 1, wherein the housing is injection-molded of plastic.

19. A device according to claim 1, wherein the cover is injection-molded of plastic.

20. A device according to claim 1, wherein the flange sleeve is injection-molded of plastic.

21. In combination, a hydraulic force transfer system with a slave cylinder which is actively connected via a fluid column with a master cylinder; and a device to reduce vibrations in a hydraulic force transfer system which has a master cylinder and a slave cylinder connected to the master cylinder via a fluid column, with a housing and a membrane, the membrane having an edge by which it is attached to the housing, wherein the housing and the membrane delimit a chamber which can be connected via a connection to the master cylinder and via a further connection to the slave cylinder, so that the membrane can be pressurized hydraulically by the fluid column between the master cylinder and slave cylinder, and wherein the membrane, at least in a rest state of the hydraulic force transfer system, is pressed by means of a spring element against the direction of the hydraulic pressurization of the membrane against a support surface on the chamber side;

said device to reduce vibrations being connected in the fluid column between the slave cylinder and master cylinder to reduce vibrations, which with its corresponding connection is joined to the master cylinder.

22. A combination according to claim 21, wherein said device to reduce vibrations is plug-connected directly to the master cylinder.

23. A combination according to claim 21, wherein the housing of said device to reduce vibrations is an integral part of the housing of the master cylinder.

* * * * *